(12) United States Patent
Adashek

(10) Patent No.: US 10,979,249 B1
(45) Date of Patent: Apr. 13, 2021

(54) EVENT-BASED CONTENT PRESENTATION USING A SOCIAL MEDIA PLATFORM

(71) Applicant: Twitter, Inc., San Francisco, CA (US)

(72) Inventor: Andrew Jared Adashek, Alhambra, CA (US)

(73) Assignee: Twitter, Inc., San Francisco, CA (US)

( * ) Notice: Subject to any disclaimer, the term of this patent is extended or adjusted under 35 U.S.C. 154(b) by 115 days.

(21) Appl. No.: 14/535,235

(22) Filed: Nov. 6, 2014

Related U.S. Application Data

(60) Provisional application No. 61/946,827, filed on Mar. 2, 2014.

(51) Int. Cl.
*H04L 12/58* (2006.01)
*H04L 15/32* (2006.01)

(52) U.S. Cl.
CPC .................. *H04L 15/32* (2013.01)

(58) Field of Classification Search
CPC .................................... H04L 51/32
USPC ............................................. 709/206
See application file for complete search history.

(56) References Cited

U.S. PATENT DOCUMENTS

| | | | | |
|---|---|---|---|---|
| 8,259,788 B2* | 9/2012 | Keren | ............... | H04N 19/587 375/240.01 |
| 2006/0187228 A1* | 8/2006 | Jung | ............... | G06F 3/1454 345/537 |
| 2007/0196806 A1* | 8/2007 | Ljungman | ............... | G09B 3/00 434/350 |
| 2008/0297587 A1* | 12/2008 | Kurtz | ............... | G06K 9/00335 348/14.08 |
| 2009/0089352 A1* | 4/2009 | Davis | ............... | G06Q 10/00 709/201 |
| 2009/0091581 A1* | 4/2009 | Lapa | ............... | G01B 11/25 345/582 |
| 2011/0022471 A1* | 1/2011 | Brueck | ............... | G06Q 30/02 705/14.61 |
| 2011/0206344 A1* | 8/2011 | Simpson | ............... | G09G 5/003 386/230 |
| 2011/0239142 A1* | 9/2011 | Steeves | ............... | G06F 3/14 715/764 |
| 2012/0084667 A1* | 4/2012 | Hickman | ............... | G06Q 30/02 715/751 |
| 2012/0159327 A1* | 6/2012 | Law | ............... | H04N 21/47217 715/716 |
| 2012/0192227 A1* | 7/2012 | Fleischman | ............... | H04N 21/2407 725/34 |
| 2012/0233000 A1* | 9/2012 | Fisher | ............... | G06Q 30/02 705/14.71 |

(Continued)

*Primary Examiner* — Umar Cheema
*Assistant Examiner* — Tony Williams
(74) *Attorney, Agent, or Firm* — Fish & Richardson P.C.

(57) ABSTRACT

A system and method for event-based content presentation, including: receiving a content presentation request to present a content item at an event where presentation of the content item can be captured. The content presentation request can include an event identifier identifying the event at which the content item is to be presented, and can further identify the content item to be displayed. The submitted content item can be presented on a content presentation device located at the event. Presentation of the content item can be captured and the resulting captured content presentation can be stored, broadcasted on a messaging platform, provided to the requesting user, etc.

19 Claims, 9 Drawing Sheets

(56) References Cited

U.S. PATENT DOCUMENTS

| | | | | |
|---|---|---|---|---|
| 2012/0254774 A1* | 10/2012 | Patton | .................... | H04L 51/20 |
| | | | | 715/758 |
| 2013/0073622 A1* | 3/2013 | Nguyen | ........... | H04N 21/23103 |
| | | | | 709/204 |
| 2013/0073623 A1* | 3/2013 | Nguyen | ........... | H04N 21/23103 |
| | | | | 709/204 |
| 2013/0124508 A1* | 5/2013 | Paris | ................... | G06F 17/3028 |
| | | | | 707/723 |
| 2013/0185765 A1* | 7/2013 | Hew | ...................... | H04L 63/10 |
| | | | | 726/3 |
| 2013/0305278 A1* | 11/2013 | Gordon | ............. | H04N 21/2665 |
| | | | | 725/32 |

\* cited by examiner

EVENT-BASED CONTENT PRESENTATION USING A SOCIAL MEDIA PLATFORM

CROSS-REFERENCE TO RELATED APPLICATIONS

This application claims the benefit of U.S. Provisional Application No. 61/946,827, filed on Mar. 2, 2014 and entitled "EVENT-BASED CONTENT PRESENTATION USING A SOCIAL MEDIA PLATFORM". Application No. 61/946,827 is incorporated by reference herein, in its entirety, for all purposes.

BACKGROUND

Social media allows fans to interact directly with their favorite celebrities and events. For example, users can send messages to or tag their favorite celebrities in content using a social media service. Likewise, users can share messages and comments regarding a major award show, sporting event, etc. While social media allows fans to connect with their favorite celebrities and share in the excitement of their favorite events, oftentimes fans cannot be physically present at events attended by their favorite celebrities. Accordingly, improvements are needed.

SUMMARY

In general, in one aspect, the invention relates to a system for capturing presentation of a content item. The system can include: A computer processor, and a content presentation module executing on the computer processor and configured to enable the computer processor to: receive a content presentation request to present a content item at an event, where the content presentation request includes an event identifier identifying the event at which the content item is to be presented, and identifies the content item to be displayed; provide the content item for presentation on a content presentation device located at the event; receive a captured presentation of the content item captured by the content presentation device, and store the captured content presentation.

In general, in one aspect, the invention relates to a method for capturing presentation of a content item. The method can include: receiving, by a computer processor, a content presentation request to present a content item at an event, where the content presentation request includes an event identifier identifying the event at which the content item is to be presented, and identifies the content item to be displayed; presenting the content item on a content presentation device located at the event; capturing presentation of the content item by the content presentation device, and storing the captured content presentation.

In general, in one aspect, the invention relates to a non-transitory computer-readable storage medium having instructions for capturing presentation of a content item. The instructions are configured to execute on at least one computer processor to enable the computer processor to: receive a content presentation request to present a content item at an event, wherein the content presentation request includes an event identifier identifying the event at which the content item is to be presented, and identifies the content item to be displayed; provide the content item for presentation on a content presentation device located at the event; receive a captured presentation of the content item captured by the content presentation device, and store the captured content presentation.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1A:
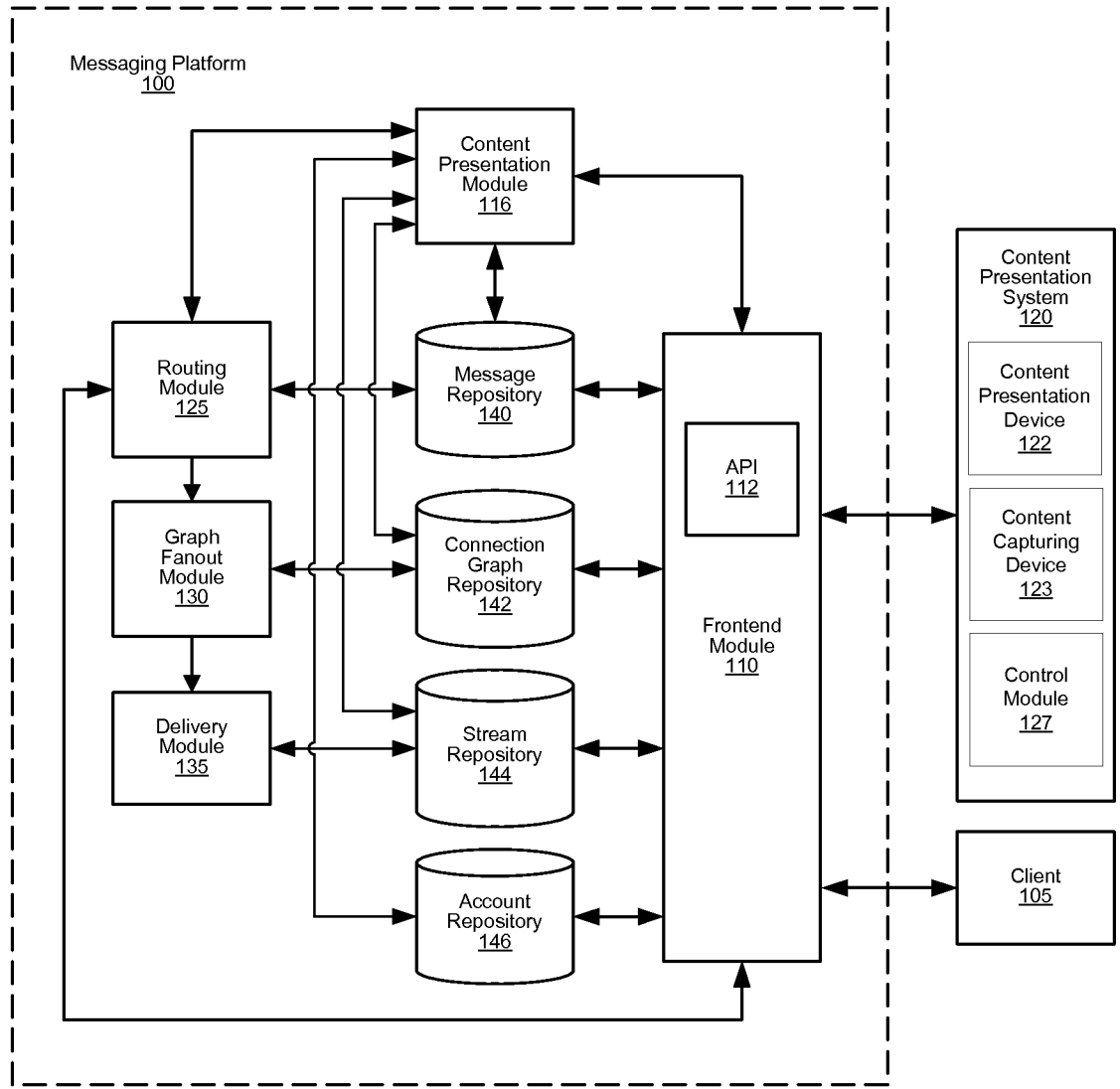
FIG. 1A shows a schematic diagram of a system, in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments of the invention provide a method and system for event-based content presentation using a messaging platform. A messaging platform can include functionality to enable users of the messaging platform to submit a content item (e.g., such as an image, video, audio, etc.) for presentation at an event, where the submitted content item can be can be presented and presentation of the content item can be captured, and/or modified at a physical location of the event. An event can be any type of location where the submitted content item can be presented and/or captured. For example, an event can be a high profile event such as a televised awards show. Alternatively, an event can be a landmark location, such as Times Square in New York, the Eiffel Tower in Paris, etc. As another example, an event can be an object, such as an automobile, boat, etc.

Content submitted for presentation at the event can be presented by one or more content presentation devices located at the event. For example, a content item such as an image can be presented by a content presentation device such as a display monitor located at the event location. Alternatively, a content item such as audio can be presented by a content presentation device such as speakers located at the event location.

The presented content item, or a modified version of the content item, can be captured by one or more content capturing devices located at the event. A content capturing device can be positioned at a location in relation to a content presentation device that allows the content capturing device to capture the content item as it is presented by the content capturing device. For example, a content capturing device such as a camera can be positioned facing a content presentation device such as a monitor to capture images presented by the monitor. Alternatively, a content capturing device such as an audio recorder can be positioned in an adequate location to a content presentation device such as speakers to properly capture audio presented by the speakers.

A content capturing device and content presentation device can be synchronized such that the content capturing device captures each content item while the content item is presented by the content presentation device. For example, a camera can be synchronized with a monitor to take a picture as each new image is presented by the monitor. Alternatively, a video recorder can be synchronized with a monitor to record video as each video is presented on the monitor.

The captured content presentation can then be displayed, broadcasted, provided to the user, etc. For example, the captured content presentation can be broadcasted by an account of the messaging platform associated with the event. Alternatively, the captured content presentation can be provided to the user and broadcasted by the user's account on the messaging platform.

FIG. 1A shows a messaging platform (100) and a client device (105) in accordance with one or more embodiments of the invention. As shown in FIG. 1A, the messaging platform (100) has multiple components including a frontend module (110) with an application programming interface (API) (112), a content presentation module (116), a routing module (125), a graph fanout module (130), a delivery module (135), a message repository (140), a connection graph repository (142), a stream repository (144), and an account repository (146). One or more components of the messaging platform (100) can be communicatively coupled with one or more other components of the messaging platform (100) (e.g., the content presentation module (116) may be communicatively coupled with the frontend module (110) and the routing module (125)). Various components of the messaging platform (100) can be located on the same device (e.g., a server, mainframe, desktop Personal Computer (PC), laptop, Personal Digital Assistant (PDA), telephone, mobile phone, kiosk, cable box, and any other device) or can be located on separate devices connected by a network (e.g., a local area network (LAN), the Internet, etc.). Those skilled in the art will appreciate that there can be more than one of each separate component running on a device, as well as any combination of these components within a given embodiment of the invention.

In one or more embodiments, the messaging platform (100) is a platform for facilitating real-time communication between one or more entities. For example, the messaging platform (100) may store millions of accounts of individuals, businesses, and/or other entities (e.g., pseudonym accounts, novelty accounts, etc.). One or more users of each account may use the messaging platform (100) to send messages to other accounts inside and/or outside of the messaging platform (100). The messaging platform (100) may include functionality to enable users to communicate in "real-time", i.e., to converse with other users with a minimal delay and to conduct a conversation with one or more other users during concurrent sessions. In other words, the messaging platform (100) may allow a user to broadcast messages and may display the messages to one or more other users within a reasonable time frame so as to facilitate a live conversation between the users. Recipients of a message may have a predefined graph relationship with an account of the user broadcasting the message (e.g., based on an asymmetric graph representing accounts as nodes and edges between accounts as relationships). In one or more embodiments, the user is not an account holder or is not logged in to an account of the messaging platform (100). In this case, the messaging platform (100) may include functionality to allow the user to broadcast messages and/or to utilize other functionality of the messaging platform 100 by associating the user with a temporary account or identifier.

Figure 1B:
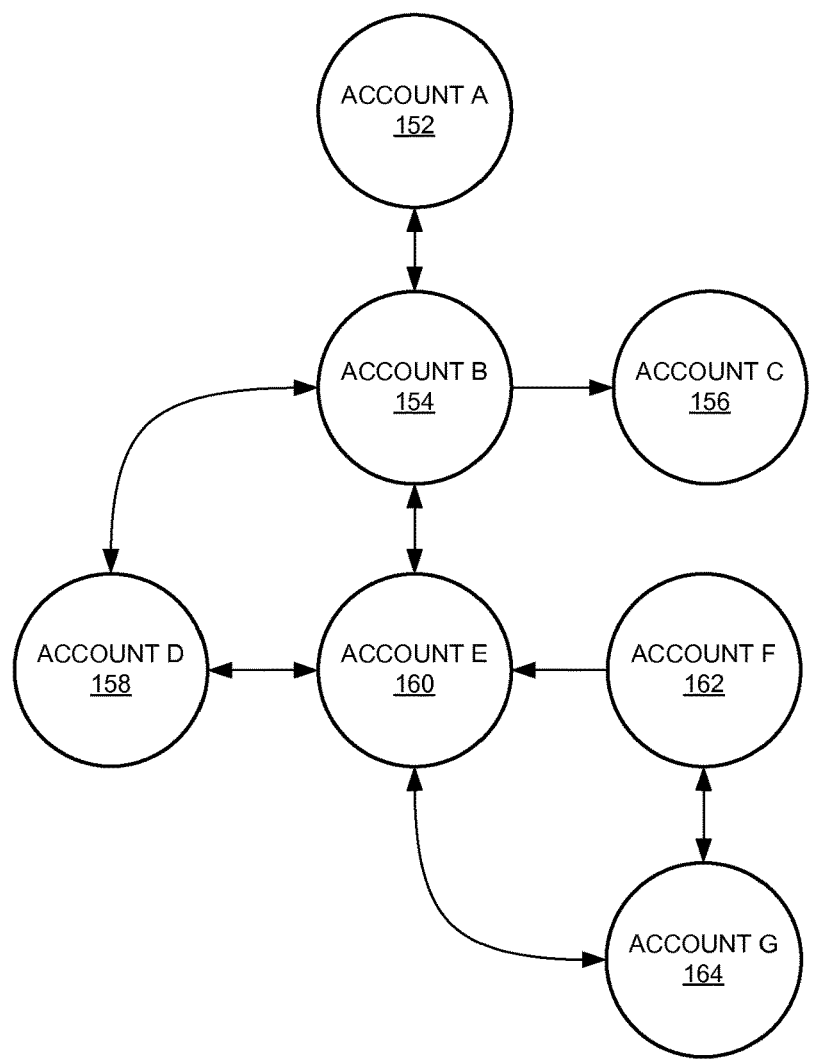
FIG. 1B shows an example depiction of a connection graph in accordance with one or more embodiments.

Relationships between accounts of the messaging platform (100) can be represented by a connection graph. FIG. 1B shows an example depiction of a connection graph (150) in accordance with one or more embodiments of the invention. In one or more embodiments, the connection graph repository (142) is configured to store one or more connection graphs. As shown in FIG. 1B, the connection graph (150) includes multiple components including nodes representing accounts of the messaging platform (100) (i.e., Account A (152), Account B (154), Account C (156), Account D (158), Account E (160), Account F (162), Account G (164)) and edges connecting the various nodes.

The connection graph (150) is a data structure representing relationships (i.e., connections) between one or more accounts. The connection graph (150) represents accounts as nodes and relationships as edges connecting one or more nodes. A relationship may refer to any association between the accounts (e.g., following, friending, subscribing, tracking, liking, tagging, and/or etc.). The edges of the connection graph (150) may be directed and/or undirected based on the type of relationship (e.g., bidirectional, unidirectional), in accordance with various embodiments of the invention.

Many messaging platforms include functionality to broadcast streams of messages to one or more accounts based at least partially on a connection graph representing relationships between those accounts (see FIG. 1B). A stream may be a grouping of messages associated with one or more accounts or can reflect any arbitrary organization of messages that is advantageous for the user of an account. In accordance with various embodiments of the invention, a "message" is a container for content broadcasted/posted by or engaged by an account of a messaging platform. Messages can be authored by users and can include any number of content types (multimedia, text, etc.).

Returning to FIG. 1A, in one or more embodiments, the content presentation module (116) includes functionality to enable a user of the messaging platform (100) to submit a content item that the user wishes to have presented at a specified event, where presentation of the submitted content item can be captured. The captured content presentation can then be provided to the user, broadcasted by the messaging platform (100), or used for any other purpose.

A content item can include any type of digital content such as an image, video, audio, text, etc. The content item may be a user-submitted item, an advertisement, etc. An event can be, include, or involve any type of location where the submitted content item can be presented and the presentation can be captured. For example, an event can be a high profile event such as a televised awards show. Alternatively, an event can be a landmark location, such as Times Square in New York City, the Eiffel Tower in Paris, etc. An event can also be an object, such as an automobile, boat, etc. A user can submit an image of him/herself to be presented at an event, such as a major awards show, where the image can be presented, and a picture of the image can be captured and provided to the user, broadcasted on the messaging platform (100), etc.

To accomplish this, in one or more embodiments, the content presentation module (116) includes functionality to receive a content presentation request from a user that requests that a content item provided by the user be presented at an event. The content presentation request can identify the content item and the event where the user would like the content item to be presented. For example, the content presentation request can include the content item that the user would like to present as an attachment. Alternatively, the content presentation request can include a link or identifier, such as a Uniform Resource Locator (URL), that can be used to access the content item the user would like to be presented. The content presentation request can also include an event identifier identifying the event where the user would like the content item to be presented.

In one or more embodiments, the content presentation module (116) includes functionality to provide a content presentation interface enabling a user to request that a content item be presented at a specified event. A content presentation interface can be an interface including information, controls, user interface elements, etc., that enable a user to perform functionality associated with requesting that a content item be presented at a specified event. For example, the content presentation interface can enable a user to view available events, select an event at which to present a content item, upload a content item, select features or preferences for presentation of a content item, etc. A user can access the messaging platform (100) using a client device (105) and request the content presentation interface be presented on the client device (105). The content presentation module (116) can provide data to the client device (105) that can be rendered by the client device (105) to provide the content presentation interface to a requesting user.

The content presentation interface can include functionality to enable a user to select a content item to present at a specified location. For example, the content presentation interface can enable a user to upload a content item from the client device 105 to present at the event (e.g., a user can submit their image for display on a billboard). Alternatively, the content presentation interface can enable a user to provide a link, address, uniform resource locator, etc., that identifies the location of the content item.

The content presentation interface can include functionality to enable a user to select an event where the content item is to be presented. For example, the content presentation interface can include functionality to enable a user to enter an event identifier (e.g., a hashtag selected by an organizer of the event) identifying the selected event or "check in" to a location that is associated with an event at or proximate to that time (e.g., use a location-determining function of a mobile phone near a music festival). Alternatively, the content presentation interface can present a list of available events and enable a user to select one of the available events.

The content presentation interface can include functionality to enable a user to submit the content presentation request after the user has provided the required information, such as identifying or providing the content item and identifying the event where the content item is to be presented. For example, the content presentation interface can include a user interface element, such as a button, that when selected, causes a content presentation request including the provided information to be submitted.

Alternatively, in one or more embodiments, the content presentation module (116) includes functionality to receive a content presentation request as a message broadcasted from a user account. For example, an event where a content item can be presented can have a designated event account on the messaging platform (100). An event account can be an account on the messaging platform (100) that is designated to an event rather than a user. For example, an event account can be created for an awards show, location, concert, specified item, etc. To submit a content presentation request to present a content item at an event, a user can send a message from their user account to the event account associated with the event. The message can include the content item and/or identify the content item the user would like presented at the specified event. In one or more embodiments, the messaging platform (100) may require that a user link their user account to the event account to be able to transmit a content presentation request to the event account.

Upon receiving a content presentation request, the content presentation module (116) can include functionality to transmit the content item to a content presentation system (120) for the specified event. The content presentation system (120) can include functionality to present the content item at the event and capture presentation of the content item. For example, the content presentation system (120) can be located at the event location and include a content presentation device (122) and a content capturing device (123). The content presentation device (122) can be any type of device capable of presenting a content item, such as a monitor, speaker, etc. A content capturing device (123) can be any type of device capable of capturing content, such as a camera, video recorder, audio recorder, etc.

The content presentation device (122) can be located at the event location and can be used to present a content item. Likewise, the content capturing device (123) can be located at the event location and positioned to capture presentation of a content item by the content presentation device (122). For example, a content capturing device (123) such as a camera and a content presentation device (122) such as a monitor can be positioned across from each other at an event so that the camera can take pictures of images presented on the monitor. Likewise, a content capturing device (123) such as an audio recording device can be positioned near a content presentation device (122) such as a speaker so that the audio recording device can record audio played through the speaker.

In one or more embodiments, the content presentation device (122) and the content capturing device (123) are synchronized with one another such that the content capturing device (123) captures content items concurrently with presentation of content items by the content presentation device (122). For example, a content capturing device (123) such as a camera can be synchronized with a content presentation device (122) such as a monitor, such that the camera takes a picture concurrently with presentation with each new image or video frame by the monitor. Alternatively, a content capturing device (123) such as a video camera can be synchronized with a video presentation device (122) such as a monitor, such that the video camera records video concurrently with at least a portion of each video presented on the monitor.

Synchronizing the content capturing device (123) and the content presentation device (122) can ensure that presentation of each content item by the content presentation device (122) at the event is captured. Further, synchronization can greatly increase the speed and efficiency at which content items can be presented and captured at the event. For example, content items such as images can be presented and captured at a high speed if a camera is synchronized with the monitor to capture each image as it is presented by the monitor.

In one or more embodiments, the content presentation system (120) includes a control module (127) configured to synchronize the content capturing device (123) and the content presentation device (122) such that the content capturing device (123) captures content concurrently with presentation of a content item by the content presentation device (122). The control module (127) can manage presentation of content items by the content presentation device (122), as well as manage when the content capturing device (123) captures content. For example, in one or more embodiments, the control module (127) transmits a command to the content presentation device (122) to present a content item, and also send a corresponding command to the content capturing device to capture the presented content item, resulting in the content capturing device (123) capturing content concurrently with presentation of a content item by the content presentation device (122).

Alternatively, in one or more embodiments, the command module (127) includes functionality to transmit a command to the content presentation device (122) to begin presenting content items at a specified rate, and also send a corresponding command to the content capturing device (123) to begin capturing content items at the same specified rate or a rate faster than the specified rate. For example, the command module (127) can transmit a command to a monitor to begin presenting images at a specified frame-rate, such as 10 images/frames per second. The command module (127) can send a corresponding message to the camera to begin taking pictures of the monitor at the same frame-rate, such as a frame-rate faster then 10 pictures per second, resulting in presentation of each new image being captured by the camera. Although the frame-rate of the content presentation device (122) and the content capturing device (123) can be equal and synchronized, in some embodiments, the frame-rates of each can also be varied such that the frame-rates are not synchronized and/or not equal. It should be appreciated that the specified rate of presentation and/or capture rate can be any rate (e.g., such that a single presented image may be indistinguishable or unidentifiable to the human eye). In one or more embodiments, the command module (127) synchronizes the capture rate of the content capturing device (123) with the presentation frame-rate of the content presentation device (122). For example, a capture rate of 10 FPS can be synchronized with a presentation frame-rate of 30 FPS.

Alternatively, in one or more embodiments, the content presentation device (122) includes functionality to transmit a command to the content presentation device (123) to capture content concurrently with presentation of a content item by the content presentation device (123). For example, the content presentation device (123) can transmit a command to the content capturing device (122) immediately before or concurrently with presentation of a content item by the content presentation device (123), thereby synchronizing the content presentation device (123) and the content capturing device (122).

While the command module (127) and the content presentation module (116) are presented as separate modules, this is just one example and is not meant to be limiting. In one or more embodiments, the command module (127) is integrated within the the content presentation module (116) and/or the content capturing device (123) (e.g., the functionality described as being performed by the command module (127) is performed by the content presentation module (116)). Likewise, while content presentation system (120) and messaging platform (100) are presented as two separate entities, this is just for illustrative purposes and is not meant to be limiting. In one or more embodiments, the messaging platform (100) and the content presentation system (120) are the same such that the described functionality and components of the content presentation system (120) can be part of the messaging platform (100).

In one or more embodiments, the content presentation module (116) includes functionality to filter content provided by users to be presented at the event. For example, content items can be filtered for content to ensure that they are appropriate and do not include any prohibited images, text, etc. Content presentation module (116) can include functionality to analyze each received content item for prohibited images, text, etc. For example, the content presentation module (116) can include functionality to scan text included in the content item to determine if the content item includes prohibited content. Alternatively, in some embodiments, the content presentation module (116) can perform an image scan of a content item to determine if the content item includes any prohibited images. The content presentation module (116) can filter out any content items determined to be prohibited or including unwanted content, resulting in the content item not being presented at an event.

In one or more embodiments, the filtering of content items is performed manually by a moderator rather than by content presentation module (116). For example, the content presentation module (116) can include functionality to transmit the receive content items to client devices where they can be viewed and approved by a moderator.

In one or more embodiments, a content item is required to include a specified piece of content to be presented at an event. For example, presentation of content items at an event can be sponsored by an advertiser and the advertiser can request that an image, watermark, logo, text, etc., of their product be included in the content item for it to be presented at the event. The content presentation module (116) can include functionality to determine whether the content item includes the specified piece of content. For example, an advertiser such as a soda company can sponsor an event such as an awards show so that users can have their image presented and captured at the awards show. The soda company can require that each user be holding one of the soda company's soda products in the image for it to be presented at the event.

In one or more embodiments, the content presentation module (116) requires that the submitted content item satisfy certain content parameters to be presented at the event. For example, an event can be associated with a theme that dictates the content of the submitted content items. For example, the theme can be dancing and the submitted content items must depict dancing in some form. Alternatively, the theme can be an explosion and the content items must depict users acting out being blown away from an explosion. Another possible theme is pets and the content item must depict a pet. Alternatively, the possible theme may be users and the content item can be required to include an image of the submitting user. The content presentation module (116) can include functionality to filter submitted content items to ensure that they adhere to the guidelines of the event theme.

In one or more embodiments, the content presentation module (116) includes functionality to perform post-filtering in addition to pre-filtering. For example, the captured content presentations can be filtered based on specified criteria, such as ensuring that it does not include any prohibited or unwanted content.

After a content item has been presented by the content presentation device (122) and captured by the content capturing device (123) the captured content presentation can be used in numerous ways. In one or more embodiments, the content presentation module (116) broadcasts the captured content presentation from the event account of the event at which the content item was presented. For example, an image presented at an awards show can be broadcasted in a message from the award show's account on the messaging platform (100). The broadcasted message can identify the user that submitted the content item to be presented. For example, the broadcasted message can include an account identifier of the messaging platform (100) identifying the user account of the user that submitted the content item. As another example, the broadcasted message can include the name of user that submitted the content item and/or the event at which the content item was presented.

In one or more embodiments, the content presentation module (116) transmits the captured content presentation to the user that submitted the content item. For example, the content presentation module (116) can transmit the captured content presentation to the user's account on the messaging platform (100) as a broadcasted message and/or a private message. The content presentation module (116) can also transmit the captured content presentation to the user in any other way, such as e-mail, text message, etc. The content presentation module (116) can transmit or deliver the captured content presentation based on a preferred communication method defined by the user and/or event coordinator. For example, the communication method may include broadcasting the captured content presentation as a publicly viewable message in the messaging platform (100), transmitting the captured content presentation from the user to another user (e.g., a point-to-point direct message), transmitting the captured content presentation from the user to a group of users (e.g., a group chat), and any other communication method definable by the user, event coordinator, and/or messaging platform (100).

In one or more embodiments, the content presentation module (116) includes functionality to modify the captured content. For example, the content presentation module (116) can modify the captured content to include information regarding the event, user, etc., such as the event name, date, the user name, etc. The content presentation module (116) includes functionality to modify the captured content to add images or texture maps to services in a captured photo. The content presentation module (116) includes functionality to dynamically or "on-the-fly" make these modifications. For example, the content presentation module (116) can dynamically update an object in a photo or video (e.g., a red-carpet backdrop with a first brand logo) with other images or texture maps (e.g., with other advertising brands). The content presentation module (116) can also modify the captured content presentation to include data identifying a sponsor of the event, such as the sponsor's logo, mark, watermark, etc. A watermark or other image may be superimposed on the captured image that includes information about the captured image (e.g., an identification of the user that submitted the content item, the event or location at which the content item was captured, objects or people who appear in the image, etc) and/or a logo (e.g., the logo of an advertiser, the logo of an event coordinator, etc.

In one or more embodiments, the content presentation module (116) can include functionality to aggregate multiple captured content presentations. For example, the content presentation module (116) can aggregate the multiple captured content presentations into a montage video, which can be broadcasted, made publicly available on a website, etc.

In one or more embodiments, the content presentation module (116) can aggregate multiple captured content presentations into a custom stream. For example, the content presentation module (116) can aggregate captured content presentations submitted by a single user into a custom stream for the user. The custom stream would then present the captured content presentation of each content item submitted by the user based on the day, time, etc. the user submitted the content items. Alternatively, the content presentation module (116) can aggregate captured content presentations from a specified event and present them in a custom stream associated with the event. In one or more embodiments, the content presentation module (116) can aggregate captured content presentations from events associated with a specified sponsor. For example, captured content presentations from events sponsored by the sponsor can be aggregated and presented in a stream.

In one or more embodiments, the content presentation module (116) can include functionality to aggregate captured content presentations from a group of users and create a stream and/or montage. For example, the content presentation module (116) can aggregate captured content presentations from a group of users that are friends, co-workers, etc., and create a stream and/or montage from the captured content presentations.

In one or more embodiments, the content presentation module (116) can solicit further user engagement from users regarding the captured content presentations. For example, the content presentation module (116) can prompt users to vote for their favorite captured content presentation from an event. Alternatively, the content presentation module (116) can prompt users to indicate whether they like or dislike a captured content presentation. In one or more embodiments, the messaging platform (100) may include interactive messages (e.g., messages that support voting or polling). An interactive message may be a configurable message on the messaging platform (100) that allows users to receive and aggregate engagement, and include and show external content, within the configurable message. Information about the interactive and/or configurable message (e.g., polling results) can be provided by the messaging platform (100) to an event host or a server of the event host.

Event-based content presentation can be used to allow users to virtually place themselves at a variety of events and have their virtual or physical presence at the event recorded. For example, in one or more embodiments, event-based content presentation can be used to allow users to virtually place themselves at a major awards show. For example, submitted user images can be presented in the crowd, behind the stage, behind a user's favorite celebrity, etc. For example, the content presentation device (122) can be a display screen placed behind the stage or behind a section of an award show's red carpet, and the content capturing device (123) can be a camera positioned to take a picture of the stage or red carpet section, including the display screen. Upon receiving a content presentation request, the content presentation module (116) can transmit the content item to the content presentation system (120) which can coordinate presentation of the content item on the content presentation device (122) and the capture of the presentation by content capturing device (123). Accordingly, a user can be allowed to virtually place him/herself at a major awards show, as it is being broadcasted on live television, and have their virtual presence captured.

Figure 2A:
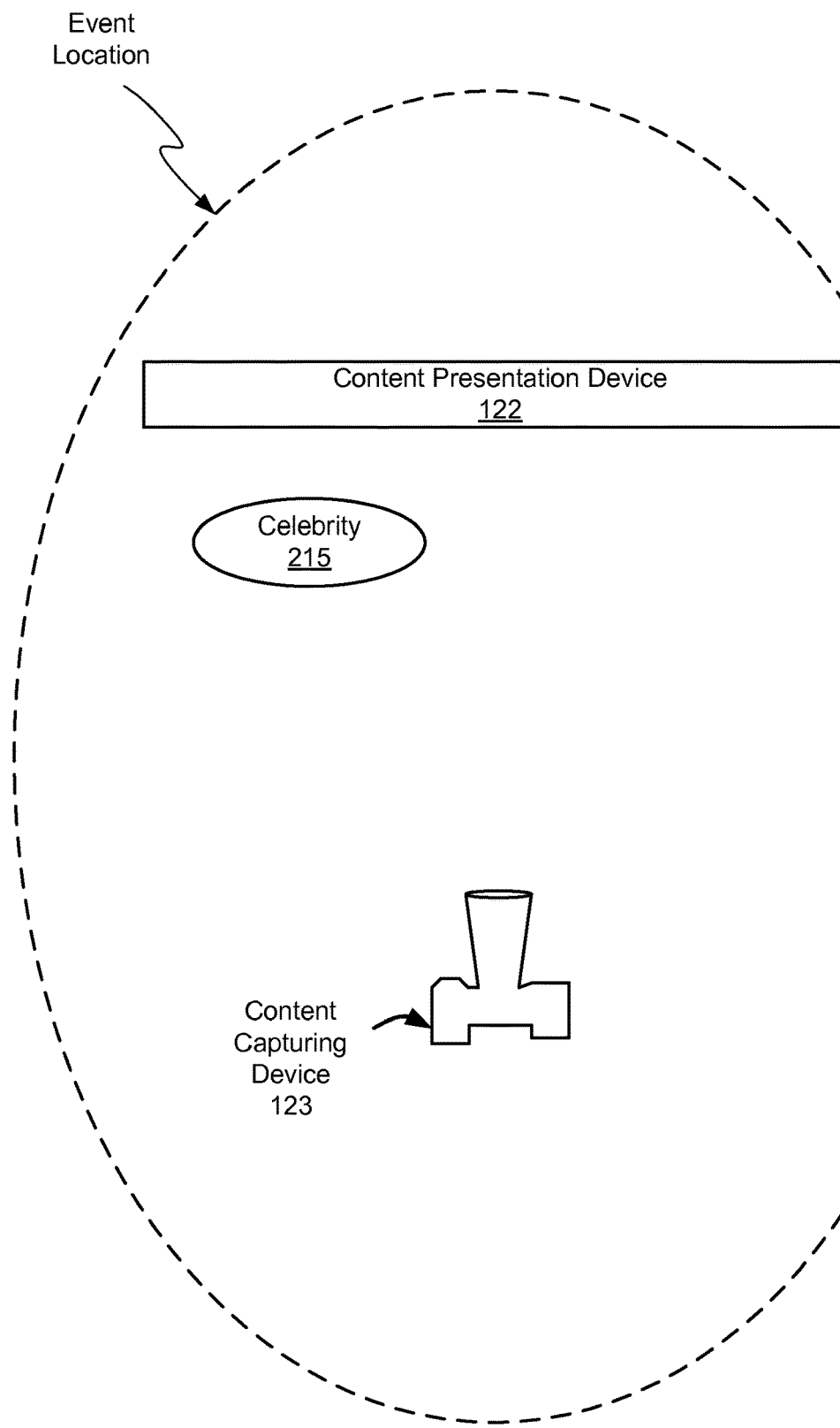
FIG. 2A shows an overhead view of the event location where a content item can be presented in accordance with one or more embodiments.

FIGS. 2A-2E illustrate a content capturing device capturing a content item at an event. FIG. 2A shows an overhead view of the event location where a content item can be presented. For example, the event location can be the red carpet leading into an awards show. As shown, a content presentation device (122) presenting the submitted content items can be positioned across from a content capturing device (123). Content items submitted by users can be presented by the content presentation device (122) and the presentation of the content item can be captured by the content capturing device (123). For example, content items such as images can be presented on a content presentation device (122) such as a screen, and captured by a content capturing device (123), such as a camera.

As shown, a celebrity (215) attending the event can be positioned between the content presentation device (122) and the content capturing device (123) resulting in images captured by the content capturing device (123) including the celebrity (215) and the content item presented on the content presentation device (122). A user can thus submit an image of him/herself, that can be presented at an awards show behind their favorite celebrity and have the moment captured.

Figure 2B:
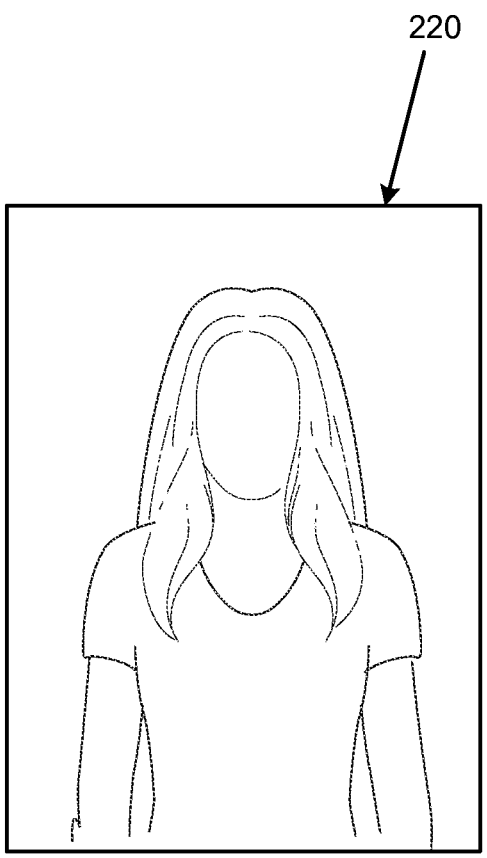
FIG. 2B shows a content item submitted by a user for presentation at an event in accordance with one or more embodiments.

FIG. 2B shows a content item (220) submitted by a user for presentation at an event such as an awards show. As shown, the content item is an image of the user. The content item (220) can be presented at the awards show along with a celebrity.

Figure 2C:
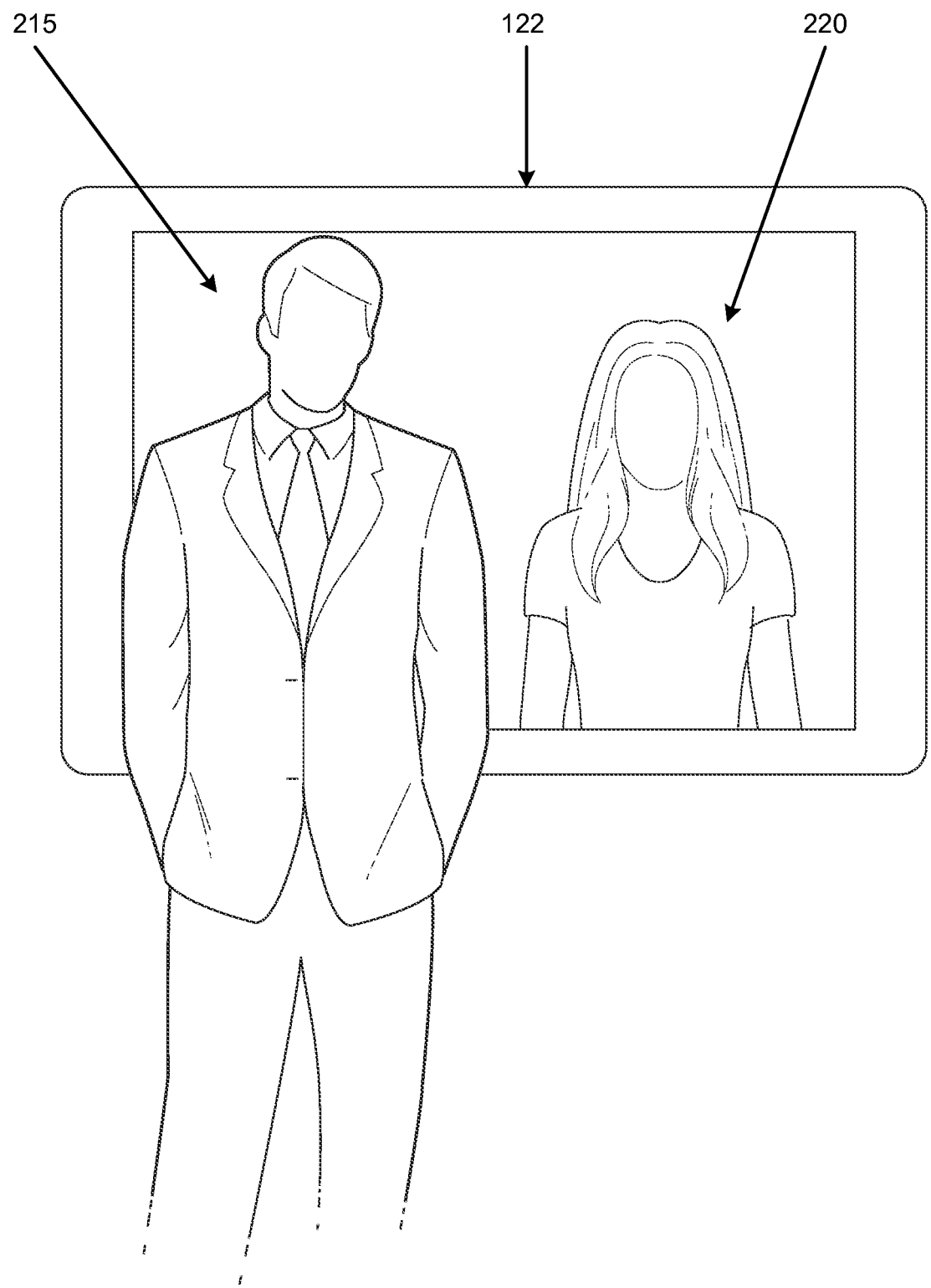
FIG. 2C shows a side view of a content item being presented on a content presentation device while a celebrity stands in front of the content presentation device, in accordance with one or more embodiments.

FIG. 2C shows a side view of the content item (220) being presented on the content presentation device (122), while a celebrity (215) stands in front of the content presentation device (122). An image captured by the content capturing device (123) can include both the celebrity (220) and the content item (220) presented on the content presentation device (122).

Figure 2D:
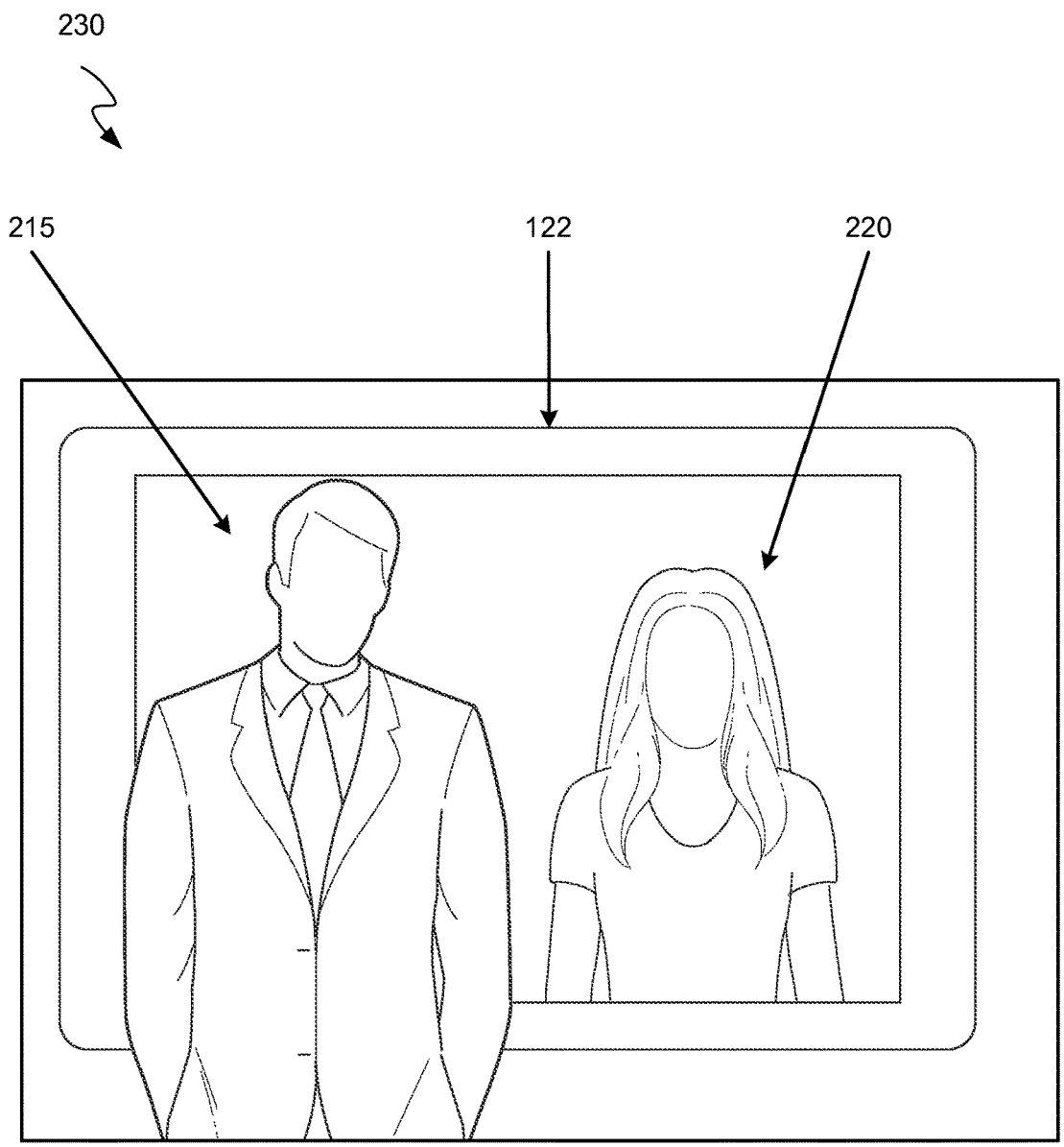
FIG. 2D shows an example of a captured content presentation in accordance with one or more embodiments.

FIG. 2D shows an example of a captured content presentation (225). As shown, the content capturing device (123) captured an image of the content item (220) presented on content presentation device (122), as well as the celebrity (215), who was positioned in front of the content presentation device (122) when presentation of the content item (220) was captured.

Figure 2E:
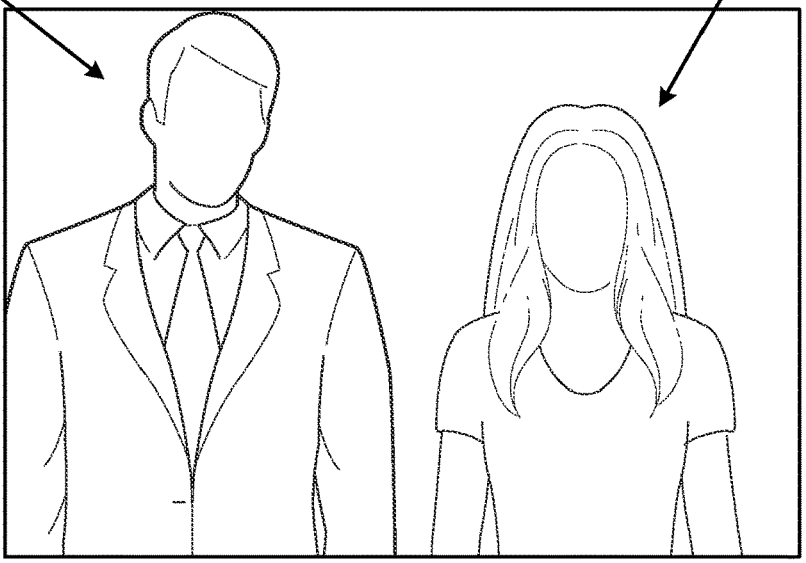
FIG. 2E shows another example of a captured content presentation in accordance with one or more embodiments.

FIG. 2E shows another example of a captured content presentation (230). Similar to the captured content presentation (225) of FIG. 2D, the captured content presentation (230) in FIG. 2E captured an image of the content item (220) presented on the content presentation device (122), as well as the celebrity (215), who was positioned in front of the content presentation device (122) when presentation of the content item (220) was captured. In contrast, however, in the captured content presentation (230) of FIG. 2E, the borders of the content presentation device (122) are not show, creating the illusion that the user depicted in content item (220) is present at the event.

It should be appreciated that while FIGS. 2A-2E are discussed with respect to an embodiment including a celebrity at an awards show, many other embodiments are possible. For example, there may be no celebrity present and the content presentation device (122) may be an electronic billboard in Times Square or in Las Vegas, with views of the respective cities in front of and/or behind the content presentation device (122).

Returning to the discussion of FIG. 1A, in one or more embodiments, an event can include sub-events within the event at which a user can have their content item presented. For example, an event such as an awards show can have sub-events such as different stages, presentation of various awards, certain celebrities, etc. at which a user can select to have their content item presented. A user can therefore request to have their image presented during a sub-event of an awards show, such as presentation of 'best picture' or as their favorite celebrity walks the red carpet.

A user can include information in their content presentation request that identifies the sub-event where the user would like their image to be presented. For example, the user can include a sub-event identifier, such as a hashtag, to indicate that the user prefers to have their image presented when a specified celebrity walks the red carpet, during presentation of a specified award, etc. The content presentation module (116) can transmit the sub-event identifier to the content presentation system (120), where the command module (127) can coordinate presentation of the content item on the appropriate content presentation device (122) at the appropriate time, to grant the user's request. For example, command module (127) can be provided with information identifying the time at which each sub-event is to occur, such as the time a specified celebrity is walking the red carpet, as well as information identifying the appropriate content presentation device (122) and content capturing device (123) to use to capture the sub-event.

In one or more embodiments, content items provided by multiple users can be presented at the same time. For example, content items depicting users reacting to an explosion can be presented along with an award for best explosion in a movie. The content items can be presented on one or more content presentation devices (122) located in the background of the stage to create the allusion that the users are being blown away from an imaginary explosion on the stage.

In one or more embodiments, the event-based content presentation can be used to allow users to virtually place themselves at a concert. For example, users can submit content items depicting themselves singing, dancing, playing music, etc., that can then be presented along or behind their favorite band during a live performance. The content presentation module (116) can transmit content items received from users to the content presentation system (120) at the live concert where the content item can be presented on a content presentation device (122) located at the concert. For example, content items such as video of a user dancing can be presented on a content presentation device (122) placed behind the stage at the concert. Alternatively, content items such as audio of a user singing can be presented on a content presentation device (122) such as a speaker located at the concert. A user can thus virtually sing along with their favorite song.

To accomplish this, in one or more embodiments, each song performed by the band can be a separate sub-event of the concert. A user can thus select the song to sing along with and include a sub-event identifier with the content presentation request to identify the selected song.

In one or more embodiments, the event-based content presentation can be used to allow users to virtually place themselves in an object, such as a car, helicopter, plane, hotel suite, etc. Marketers can provide this service to market their items, such as the cars, vacations, etc., that the marketer is selling. A content presentation device (122), such as a monitor, can be placed within the object, such as a car, in a position to make it appear that the user is driving the car.

In one or more embodiments, the event-based content presentation can be used to allow users to virtually place themselves at a landmark location, such as on a large screen at a sporting event, electronic billboards in Times Square, a billboard located with a backdrop of Las Vegas, etc. For example, the large screen, billboard, etc., can be the content presentation device (122). The content presentation module (116) can transmit received content items to the content presentation system (120) at the specified event, (e.g. Times Square, sporting event, etc.) where the content item can be presented on the content presentation device (122) and captured by a content capturing device (123).

In one or more embodiments, the messaging platform (100) includes functionality to manage advertisement campaigns relating to events. For example, an event coordinator that is managing an event can enter into a sponsorship agreement with one or more advertisers to sponsor the event. The sponsoring advertiser(s) can receive the right to promote and brand the event. For example, an event coordinator for an awards show can enter into a sponsorship agreement with various advertisers to sponsor presentation of user submitted content items at the awards show. Alternatively, the sub-events can be sponsored by advertisers. Thus an advertiser could sponsor presentation of user submitted content items on the red carpet with a specified celebrity.

A sponsorship agreement can also include sponsor dictated presentation parameters for content items that can be presented at the event, such as requiring users to perform a specified action, display specified products, etc. The content presentation module (116) can receive sponsor dictated presentation parameters and ensure that content items that are presented at the event meet the dictated presentation parameters.

Further, the sponsorship agreement can provide advertisers with the right to present the sponsors' logo, watermark, etc., on the captured presentations. Accordingly, the content presentation module (116) can modify the captured presentations to include the sponsors' logo, watermark, etc. prior to providing the captured presentation to a user and/or publishing the captured presentations.

The sponsor can be given the rights to the resulting captured content presentations, and the content presentation module (116) can aggregate the captured content presentations into a montage, stream, etc., which the sponsor can include in a marketing campaign. The content presentation module (116) includes functionality to publish the captured content presentations to the sponsor's stream. Alternatively, the content presentation module (116) can provide the captured content presentations to the sponsor, which the sponsor can then decide to publish to their stream or use in some other capacity.

In one or more embodiments, the messaging platform (100) can charge the sponsor for the broadcasted messages, the proceeds of which can be split between the messaging platform (100) and the event coordinator, celebrity, etc. For example, the messaging platform (100) can include a campaign module that manages the advertising campaigns performed by the messaging platform (100). The campaign module can track the number of broadcasted messages associated with an advertising campaign, as well as the proceeds resulting from the broadcasted messages. The campaign module can also calculate the portion of the proceeds that may be provided to each party, such as the messaging platform (100), event coordinator, celebrity, etc., and transmit funds to each party accordingly.

In one or more embodiments, the messaging platform (100) can provide captured content presentations as an advertising service to advertisers. For example, advertisers can be charged to have an advertisement, logo, watermark, etc., included on the captured content presentations, the proceeds of which can be shared with the event coordinators, celebrities, etc.

Figure 3:
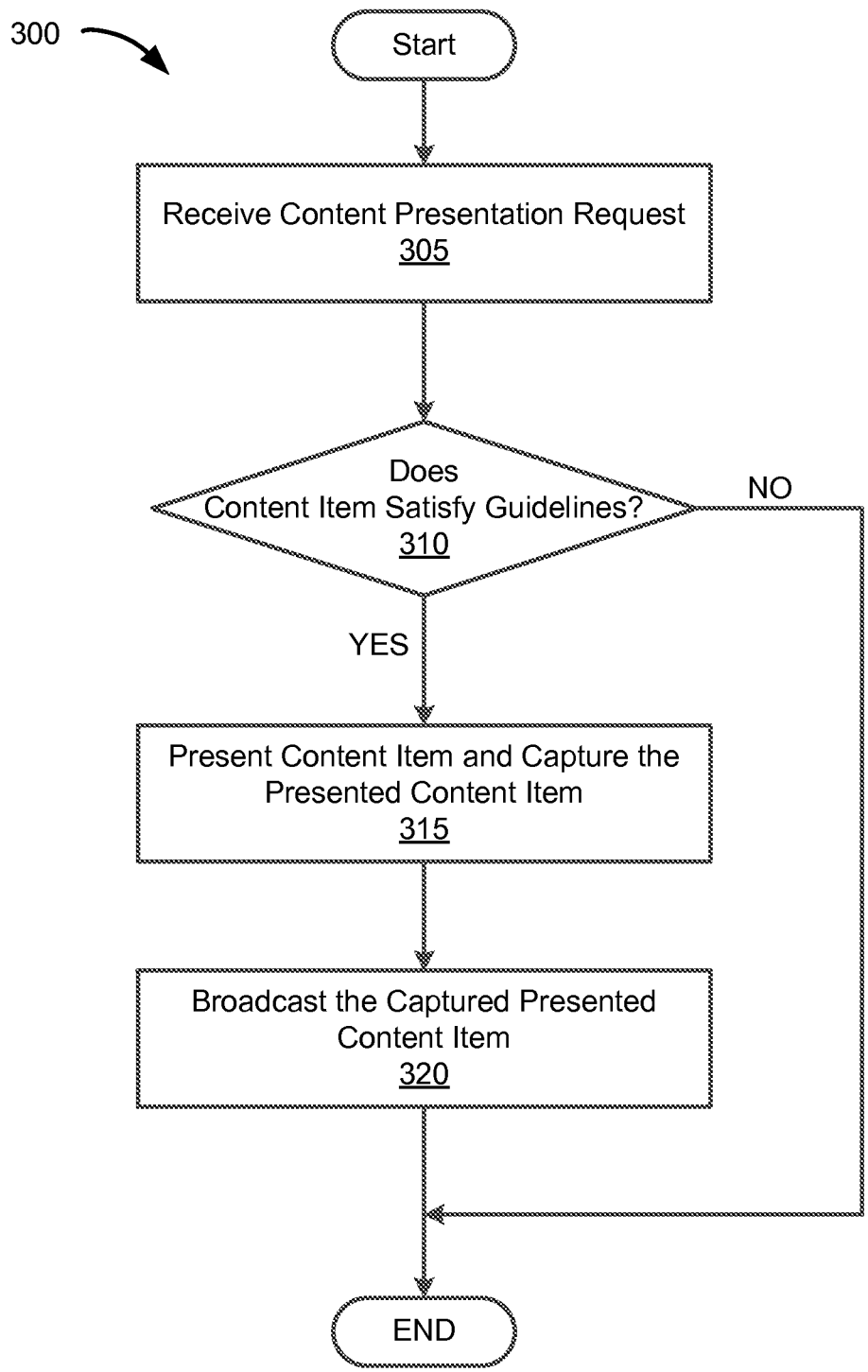
FIG. 3 shows a flowchart in accordance with one or more embodiments.

FIG. 3 shows a flowchart of a method (300) for event-based content presentation. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 305, a content presentation request is received. A content presentation request can be a request to present a content item at an event, where presentation of the content item can be captured. The content presentation request can include an event identifier identifying the event where the content item is to be presented. Further, the content presentation request can identify the content item to be presented. For example, the content presentation request can include the content item or, alternatively, include a link to access the content item. The content presentation request can also include information about the requesting user, such as the user's name, contact info, user account identifier, etc.

In STEP 310, it is determined whether the submitted content item satisfies specified presentation guidelines for the indicated event. For example, the content item can be scanned for inappropriate or prohibited content as defined by the presentation guidelines. Further, the content item can be scanned to ensure that the content of the content item satisfies a theme or content requirement as dictated by the presentation guidelines. If at step (310) it is determined that the content item satisfies the presentation guidelines, the method continues to step (315). Alternatively, if it is determined that the content item does not satisfy the specified presentation guidelines, the method may end.

In STEP 315, the content item is presented at the event and presentation of the content item is captured. For example, the content item can be presented by a content presentation device at the event and captured by a content capturing device positioned to capture content items presented by the content presentation device.

In STEP 320, the captured content presentation is broadcasted. For example, the captured content presentation can be broadcasted on a messaging platform, displayed on another display device at a location of an event where the content item was presented (e.g., on a big screen television or on a billboard), or aggregated with other content presentations to generate aggregated data (e.g., a montage).

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

Embodiments of the invention may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments of the invention.

Figure 4:
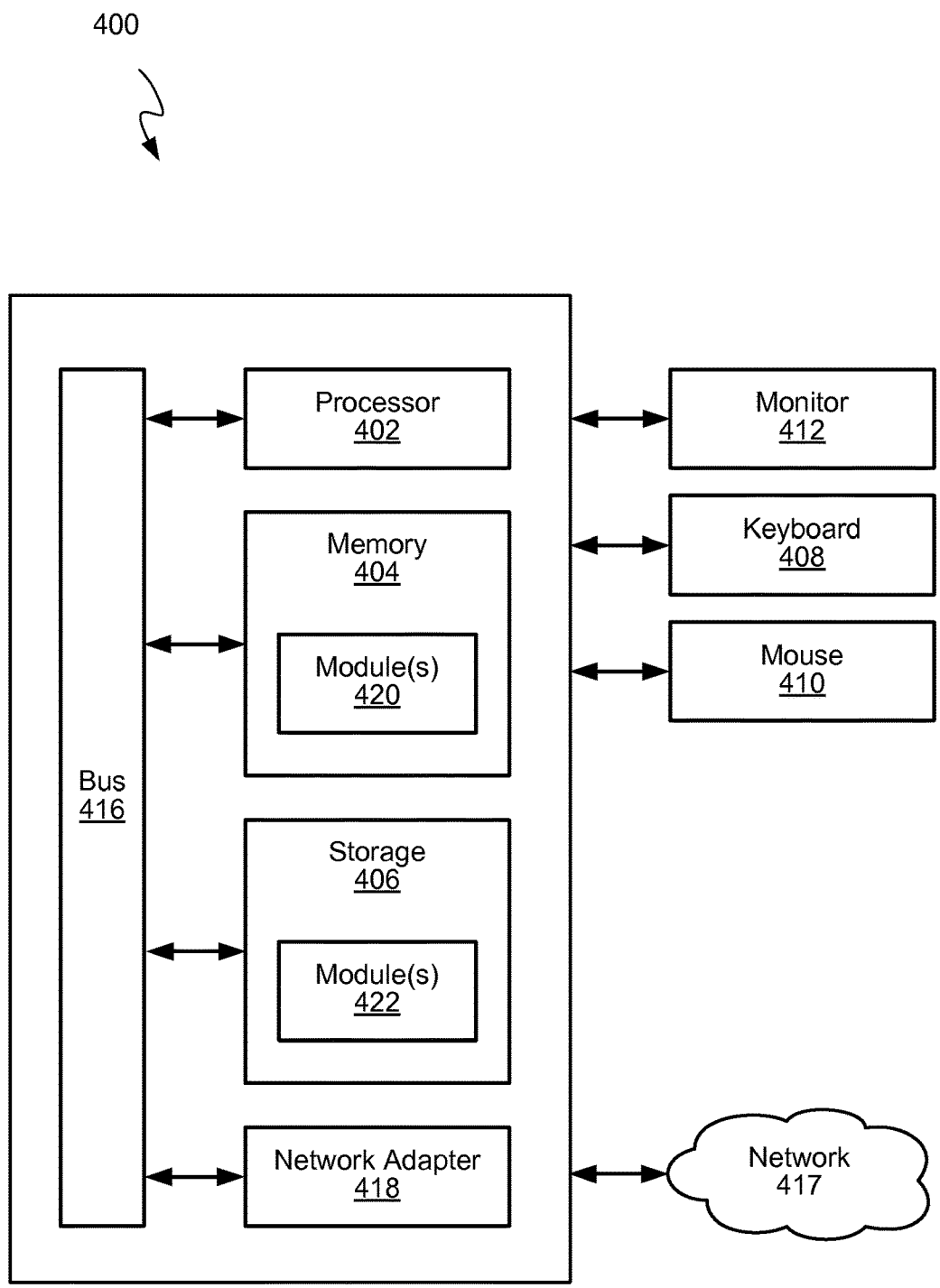
FIG. 4 shows a computer system in accordance with one or more embodiments.

For example, as shown in FIG. 4, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities.

In one or more embodiments, the computer processor(s) (402) may be an integrated circuit for processing instructions. For example, the computer processor(s) (402) may be one or more cores or micro-cores of a processor. The computer processor(s) (402) can implement/execute software modules stored by computing system (400), such as module(s) (420) stored in memory (404) or module(s) (422) stored in storage (406). For example, one or more of the modules described in FIG. 1A (e.g., the content presentation module (116)) can be stored in memory (404) or storage (406), where they can be accessed and processed by the computer processor (402). In one or more embodiments, the computer processor(s) (402) can be a special-purpose processor where software instructions are incorporated into the actual processor design.

The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. The computing system (400) may be connected to a network (414) (e.g., a local area network (LAN), a wide area network (WAN) such as the Internet, mobile network, or any other type of network) via a network interface connection (418). The input and output device(s) may be locally or remotely connected (e.g., via the network (412)) to the computer processor(s) (402), memory (404), and storage device(s) (306).

One or more elements of the aforementioned computing system (400) may be located at a remote location and connected to the other elements over a network (414). Further, embodiments of the invention may be implemented on a distributed system having a plurality of nodes, where each portion of the invention may be located on a subset of nodes within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1A and 1B) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1A and 1B) and/or flowcharts (e.g., FIG. 3). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

While the invention has been described with respect to a limited number of embodiments, those skilled in the art, having benefit of this disclosure, will appreciate that other embodiments may be devised which do not depart from the scope of the invention as disclosed herein.

What is claimed is:

1. A method comprising:
    receiving, by a messaging platform comprising one or more computers, a content presentation request from a first user account of a first user of the messaging platform to present a content item on a content presentation system located at a physical event location of an event, the content presentation system including a content presentation device with a display and also including a content capturing device positioned to capture image content shown on the display, wherein the content item is authored by the first user, wherein the first user is not physically present at the physical event location, and wherein the content presentation request:
- comprises an event identifier identifying the event at which the content item is to be presented, and
- identifies the content item to be presented on the display of the content presentation device;

receiving, by the messaging platform, the content item;
presenting, by the messaging platform, the content item on the display of the content presentation device, wherein the content item is presented as part of a sequence of a plurality of identified content items from respective content presentation requests to present respective content on the content presentation system, wherein the respective content presentation requests are from a plurality of different user accounts of the messaging platform and of different users that authored the respective content, wherein the plurality of different user accounts includes the first user account, each of the plurality of respective content presentation requests comprising the event identifier identifying the event;
capturing, by the content capturing device, video or images at the event, wherein the video or images show (i) at least a portion of the display of the content presentation device while the device is displaying the content item and (ii) at least one person or object physically present at the event and in front of the content presentation device, and broadcasting, by the content capturing device, to the messaging platform, the video and images captured at the event; and
broadcasting, by the messaging platform, the video or images as part of a first message stream to one or more recipient user accounts of the messaging platform.

2. The method of claim 1, wherein the one or more recipient user accounts include the first user account and at least one other user account related to the first user account according to relationship data maintained by the messaging platform.

3. The method of claim 1, wherein the content presentation request is received as a message broadcasted on the messaging platform to an event account associated with the event.

4. The method of claim 1,
wherein the content presentation request is a first content presentation request, and the content item is a first content item, and
wherein the method further comprises:
receiving a second content presentation request to present a second content item on the content presentation system;
analyzing the second content item to determine whether the second content item satisfies content presentation guidelines for the event, wherein the content presentation guidelines (i) define inappropriate or prohibited content for the event or (ii) define a theme or content requirement for the event;
determining from the analysis of the second content item that the second content item does not satisfy the content presentation guidelines; and
in response to determining from the analysis of the second content item that the second content item does not satisfy the content presentation guidelines, denying the second content presentation request to present the second content item at the event.

5. The method of claim 1, wherein:
the sequence of the plurality of identified content items is presented on the display of the content presentation device at a particular frame-rate; and
the content capturing device is synchronized with the content presentation device to capture video at the particular frame-rate.

6. The method of claim 1, further comprising:
for each identified content item in the plurality of identified content items in the sequence;
capturing, by the content capturing device, video or images of the identified content item, wherein the video or images of the identified content item show (i) at least a portion of the display of the content presentation device while presenting the identified content item and (ii) at least one person or object present at the event; and
broadcasting the video or images of the identified content item as part of a second message stream to the one or more recipient user accounts, including the user account that authored the respective content presentation request for the identified content item.

7. A system comprising:
a messaging platform comprising one or more computers;
a content presentation module executing on the one or more computers and configured to enable the one or more computers to:
receive a content presentation request from a first user account of a first user of a messaging platform to present a content item on a content presentation system located at a physical event location of an event, the content presentation system including a content presentation device with a display and also including a content capturing device positioned to capture image content shown on the display, wherein the content item is authored by the first user, wherein the first user is not physically present at the physical event location, and, wherein the content presentation request:
comprises an event identifier identifying the event at which the content item is to be presented, and
identifies the content item to be presented on the display of the content presentation device;
receive the content item;
provide the content item for presentation on the display of the content presentation device, wherein the content item is presented as part of a sequence of a plurality of identified content items from respective content presentation requests to present respective content on the content presentation system, wherein the respective content presentation requests are from a plurality of different user accounts of the messaging platform and of different users that authored the respective content, wherein the plurality of different user accounts the first user account, each of the plurality of respective content presentation requests comprising the event identifier identifying the event;
capture, by the content capturing device, video or images at the event, wherein the video or images show (i) at least a portion of the display of the content presentation device while the device is displaying the content item and (ii) at least one person or object physically present at the event and in front of the content presentation device, and broadcast, by the content capturing device, to the messaging platform, the video and images captured at the event; and broadcast, by the messaging platform, the video or images as part of a first message stream to one or more recipient user accounts of the messaging platform.

8. The system of claim 7, wherein the one or more recipient user accounts includes the first user account and at least one other user account related to the first user account according to relationship data maintained by the messaging platform.

9. The system of claim 7, wherein the content presentation request is received as a message broadcasted on the messaging platform to an event account associated with the event.

10. The system of claim 7, wherein the content presentation module further enables the one or more computers to:
analyze the content item to determine whether the content item satisfies content presentation guidelines for the event, wherein the content presentation guidelines (i) define inappropriate or prohibited content for the event or (ii) define a theme or content requirement for the event; and
determine from the analysis that the content item satisfies the content presentation guidelines.

11. The system of claim 7,
wherein the content presentation request is a first content presentation request, and the content item is a first content item, and
wherein the content presentation module further enables the one or more computers to:
receive a second content presentation request to present a second content item on the content presentation system;
analyze the second content item to determine whether the second content item satisfies content presentation guidelines for the event, wherein the content presentation guidelines (i) define inappropriate or prohibited content for the event or (ii) define a theme or content requirement for the event;
determine from the analysis of the second content item that the second content item does not satisfy the content presentation guidelines; and
in response to a determination from the analysis of the second content item that the second content item does not satisfy the content presentation guidelines, deny the second content presentation request to present the second content item at the event.

12. The system of claim 7, wherein:
the content capturing device is a camera positioned facing the display to capture image content shown on the display.

13. The system of claim 7, wherein the content presentation module further enables the one or more computers to:
for each identified content item in the plurality of identified content items in the sequence;
capture, by the content capturing device, video or images of the identified content item, wherein the video or images of the identified content item show (i) at least a portion of the display of the content presentation device while presenting the identified content item and (ii) at least one person or object present at the event; and
broadcast the video or images of the identified content item as part of a second message stream to the one or more recipient user accounts, including the user account that authored the respective content presentation request for the identified content item.

14. A non-transitory computer-readable storage medium comprising a plurality of instructions configured to execute on one or more computers of a messaging platform to enable the one or more computers to:
receive a content presentation request from a first user account of a first user of the messaging platform to present a content item on a content presentation system located at a physical event location of an event, the content presentation system including a content presentation device with a display and also including a content capturing device positioned to capture image content shown on the display, wherein the content item is authored by the first user, wherein the first user is not physically present at the physical location, and, wherein the content presentation request:
comprises an event identifier identifying the event at which the content item is to be presented, and
identifies the content item to be presented on the display of the content presentation device;
receive the content item;
provide the content item for presentation on the display of the content presentation device, wherein the content item is presented as part of a sequence of a plurality of identified content items from respective content presentation requests to present respective content on the content presentation system, wherein the respective content presentation requests are from a plurality of different user accounts of the messaging platform and of different users that authored the respective content, wherein the plurality of different user accounts includes the first user account, each of the plurality of respective content presentation requests comprising the event identifier identifying the event;
receive, by the content capturing device, video or images at the event, wherein the video or images show (i) at least a portion of the display of the content presentation device while the device is displaying the content item and (ii) at least one person or object physically present at the event and in front of the content presentation device, and broadcasting, by the content capturing device, to the messaging platform, the video and images captured at the event; and
broadcast the video or images as part of a first message stream to one or more recipient user accounts of the messaging platform.

15. The non-transitory computer readable storage medium of claim 14, wherein the one or more recipient user accounts include the first user account and at least one other user account related to the first user account according to relationship data maintained by the messaging platform.

16. The non-transitory computer readable storage medium of claim 14, wherein the content presentation request is received as a message broadcasted on the messaging platform to an event account associated with the event.

17. The non-transitory computer readable storage medium of claim 14, wherein the instructions further enable the one or more computers to:
analyze the content item to determine whether the content item satisfies content presentation guidelines for the event, wherein the content presentation guidelines (i) define inappropriate or prohibited content for the event or (ii) define a theme or content requirement for the event; and
determine from the analysis that the content item satisfies the content presentation guidelines.

18. The non-transitory computer readable storage medium of claim 14, wherein the content presentation request is a first content presentation request, and the content item is a first content item, and wherein the instructions further enable the one or more computers to:

receive a second content presentation request to present a second content item on the display of the content presentation device;

analyze the second content item to determine whether the second content item satisfies content presentation guidelines for the event, wherein the content presentation guidelines (i) define inappropriate or prohibited content for the event or (ii) define a theme or content requirement for the event;

determine from the analysis of the second content item that the second content item does not satisfy the content presentation guidelines; and in response to a determination from the analysis of the second content item that the second content item does not satisfy the content presentation guidelines, deny the second content presentation request to present the second content item at the event.

19. The non-transitory computer readable storage medium of claim 14, wherein the instructions further enable the one or more computers to:

for each identified content item in the plurality of identified content items in the sequence:

capture, by the content capturing device, video or images of the identified content item, wherein the video or images of the identified content item show (i) at least a portion of the display of the content presentation device while presenting the identified content item and (ii) at least one person or object present at the event; and broadcast the video or images of the identified content item as part of a second message stream to the one or more recipient user accounts, including the user account that authored the respective content presentation request for the identified content item.

\* \* \* \* \*

UNITED STATES PATENT AND TRADEMARK OFFICE
CERTIFICATE OF CORRECTION

PATENT NO. : 10,979,249 B1  
APPLICATION NO. : 14/535235  
DATED : April 13, 2021  
INVENTOR(S) : Andrew Jared Adashek Page 1 of 1

It is certified that error appears in the above-identified patent and that said Letters Patent is hereby corrected as shown below:

In the Claims

Column 18, Line 14, Claim 6, delete "sequence;" and insert -- sequence: --, therefor.

Column 19, Line 55, Claim 13, delete "sequence;" and insert -- sequence: --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*